(12) United States Patent
Pettersson et al.

(10) Patent No.: US 11,565,272 B2
(45) Date of Patent: Jan. 31, 2023

(54) SYSTEM AND METHOD FOR TREATING BIOMASS MATERIAL

(71) Applicant: VALMET AB, Sundsvall (SE)

(72) Inventors: Patrik Pettersson, Alnö (SE); Johan Carlsson, Alnö (SE)

(73) Assignee: VALMET AB, Sundsvall (SE)

(*) Notice: Subject to any disclaimer, the term of this patent is extended or adjusted under 35 U.S.C. 154(b) by 280 days.

(21) Appl. No.: 16/766,383

(22) PCT Filed: Sep. 28, 2018

(86) PCT No.: PCT/SE2018/050994
§ 371 (c)(1),
(2) Date: May 22, 2020

(87) PCT Pub. No.: WO2019/103674
PCT Pub. Date: May 31, 2019

(65) Prior Publication Data
US 2020/0346222 A1    Nov. 5, 2020

(30) Foreign Application Priority Data

Nov. 27, 2017    (SE) .................... 1751453-0

(51) Int. Cl.
*B03B 5/68* (2006.01)
*B01J 19/20* (2006.01)
(Continued)

(52) U.S. Cl.
CPC .............. *B03B 5/68* (2013.01); *B01J 19/20* (2013.01); *B08B 3/042* (2013.01); *D21B 1/02* (2013.01); *C10L 5/40* (2013.01)

(58) Field of Classification Search
CPC . B01J 19/20; B03B 5/68; B08B 3/042; B08B 9/093; C10L 5/40; D21B 1/02
See application file for complete search history.

(56) References Cited

U.S. PATENT DOCUMENTS

| 7,081,171 B1 | 7/2006 | Sabol et al. |
| 9,435,002 B2 | 9/2016 | Dang et al. |

(Continued)

FOREIGN PATENT DOCUMENTS

| CN | 105539894 A | 5/2016 |
| JP | 055720 U | 1/1993 |

(Continued)

OTHER PUBLICATIONS

Sugino, 3D Nozzle: Automatic Rotating/Revolving, High-Pressure Water Cleaning Nozzle Unit for the Inside of Tanks, 2001, http://www.sugino.com/site/cleaning-peeling-blasting-cutting-equipment-e/wj-reactor- type-3dnozzle. html (Year: 2001).*

(Continued)

*Primary Examiner* — Latosha Hines
(74) *Attorney, Agent, or Firm* — Foley & Lardner LLP

(57) ABSTRACT

According to the present invention, there is provided a cleaning system for biomass material handling systems and methods for such system. The cleaning system for a biomass material treatment stage in a continuous process system includes a hydrolysis or pre-hydrolysis reactor, a feeding arrangement is arranged to continuously feed biomass material to an inlet of the reactor, wherein reactor includes a reactor screw for moving the biomass material through the reactor and a discharge pipe including a discharge screw for continuously discharging treated biomass material. At least one high-pressure cleaning nozzle is arranged inside a housing of said reactor, wherein the at least one high-pressure cleaning nozzle is arranged to eject cleaning agent at predetermined intervals during operation of the reactor.

12 Claims, 4 Drawing Sheets

(51) Int. Cl.
  *B08B 3/04* (2006.01)
  *D21B 1/02* (2006.01)
  *C10L 5/40* (2006.01)

(56) References Cited

U.S. PATENT DOCUMENTS

2004/0178053 A1    9/2004  Burke et al.
2013/0071903 A1    3/2013  Rowland et al.
2017/0314198 A1*  11/2017  Pettersson ................ D21C 7/06

FOREIGN PATENT DOCUMENTS

| JP | 2004-137373 A | 5/2004 | |
| JP | 2012-000022 A | 1/2012 | |
| SE | 539173 C2 * | 5/2017 | ............ B01J 8/0015 |
| WO | WO 2013/126007 | 8/2013 | |
| WO | WO-2013126007 A1 * | 8/2013 | ............ B30B 9/127 |
| WO | WO 2017/158649 A1 | 9/2017 | |

OTHER PUBLICATIONS

Sugino, 3D Nozzle: Automatic Rotating/Revolving, High-Pressure Water Cleaning Nozzle Unit for the Inside of Tanks, http://www.sugino.com/site/cleaning-peeling-blasting-cutting-equipment-e/wj-reactor-type-3dnozzle.html.

\* cited by examiner

SYSTEM AND METHOD FOR TREATING BIOMASS MATERIAL

TECHNICAL FIELD

The present invention relates to processes and systems for hydrolysis and pre-hydrolysis of ligno-cellulosic biomass material, for example, for production of biofuels such as ethanol.

BACKGROUND OF THE INVENTION

Biomass refining or biorefining, where lignin, cellulose and hemicellulose is separated from biomass material is becoming more and more prevalent in industrial plants for producing, for example, bio fuels. Developing efficient processes for producing biofuel from biomass material is crucial since the oil resources in the world are diminishing at the same time as the demand for energy increases and this increasing demand for energy cannot be met by fossil sources since the global emissions of greenhouse gases, such as $CO_2$, needs to be reduced.

This is particularly important within the transportation sector and the development of efficient methods for producing biofuels, both in terms of usage of resources and economy, are therefore critical. Ethanol has been an alternative for gasoline for many years but has now become an increasingly important biofuel as source for motor fuel and fuel additive. Ethanol can be produced from, for example, biomass, ligno-cellulosic biomass material such as wood, or plant material including annual plants.

In current processes for producing biofuel, such as ethanol, the raw material is fed into a pre-hydrolysis reactor. The raw material can also be pre-steamed or pre-impregnated before being fed into the pre-hydrolysis reactor or other chemical reactor and acidifying chemicals, e.g. $H_2SO_4$, can be added.

Lignin is a major component of biomass and is typically between 15-35 wt % (dry basis) of the biomass material. Lignin has a good fuel value and is therefore of high interest to separate and recover. However, lignin is difficult to handle, for example, due to its propensity to stick to equipment and piping. This tendency to deposit on solid surfaces often causes plugging. Although lignin handling has always been known to be a challenge, there remains a need within the art for ways to either avoid lignin deposit or to deal with it when it occurs. These problems seem to be particularly present during acidic treatments such as hydrolysis or pre-hydrolysis processes in the reactor stages.

The deposits inside the reactor may also, in addition to potential plugging which may cause productions interruptions, result in wear of the exposed parts inside the reactor such as on the reactor screw.

A method used today to remove the deposits and to clean the reactor is to stop the process and manually open the reactor, dismount and remove the reactor screw and thereafter manually clean the surfaces where deposits are located using different kind of cleaning tools and cleaning agents. This process is time-consuming and also causes long production interruptions and stops.

U.S. Pat. No. 9,435,002 describes a cleaning process for hydrolysis reactors where biomass is hydrolysed in two parallel reactors. Processed biomass is withdrawn from the first reactor and further treated in the second reactor when cleaning is needed in the first reactor. Cleaning agent or cleaning liquid is added into the reactor inlet for biomass when cleaning is performed. After the cleaning process of the first reactor, the biomass is fed back to that reactor from the second reactor and hydrolysis process in both reactors is resumed.

Thus, there is a need for improved processes and systems for treating biomass in pre-hydrolysis or hydrolysis systems and for more effective cleaning methods and apparatuses for cleaning reactors in pre-hydrolysis or hydrolysis systems.

SUMMARY OF THE INVENTION

An object of the present invention is to provide improved processes and systems for treating biomass in pre-hydrolysis or hydrolysis systems.

Another object of the present invention is to provide improved processes and systems for treating biomass in pre-hydrolysis or hydrolysis systems for biofuel production.

A further object of the present invention is to provide improved processes and systems for removing lignin deposits on exposed parts of a reactor stage.

Yet another object of the present invention is to provide an improved cleaning process for automatically removing lignin deposits in a reactor stage for pre-hydrolysis or hydrolysis processes.

A further object of the present invention is to provide an improved cleaning process for automatically removing lignin deposits on the reactor screw and/or discharge screw in a reactor for pre-hydrolysis or hydrolysis processes.

These and other objects are met by the present invention as defined by the claims and embodiments described herein.

In the context of the present invention, the term "leeward side of reactor screw" or "leeward side of screw threads" relates to the downstream side of the screw threads of the reactor screw.

According to an aspect of the present invention, there is provided a cleaning system for a biomass material treatment stage in a continuous process system. The biomass material treatment stage includes a hydrolysis or pre-hydrolysis reactor, a feeding arrangement is arranged to continuously feed biomass material to an inlet of the reactor, wherein the reactor includes a reactor screw for continuously moving the biomass material through the reactor At least one high-pressure cleaning nozzle is arranged inside a housing of said reactor, wherein the at least one high-pressure cleaning nozzle is arranged to eject cleaning agent at predetermined intervals during operation of the reactor and during passage of biomass material. The at least one high-pressure nozzle is arranged to eject a cleaning agent at a pressure within a range of 15-225 bar to the reactor screw during operation of the reactor. Further, although the present invention is not arranged for use of any specific cleaning agent, examples of cleaning agents that can be used together with the present invention are, but not limited to, steam, alkaline solutions, organic solvents, and combinations of these, as is well known in the art.

In embodiments of the present invention, the cleaning nozzles are arranged to eject cleaning agent at a pressure within a range of 15-225 bar to the reactor screw during operating of the reactor.

In embodiments of the present invention, adjacent cleaning nozzles are arranged with a distance from each other within a range of 10-200 mm.

In embodiments of the present invention, the cleaning nozzles are arranged to eject cleaning agent to the reactor screw with an angle between an inner wall of the housing and a central line of the ray of cleaning agent within a range of 10-170 degrees.

In embodiments of the present invention, at least one cleaning nozzle is arranged in proximity to the inlet of the reactor inside the housing of the reactor.

In embodiments of the present invention, at least one cleaning nozzle is arranged to deliver or eject or provide cleaning agent at a flow within a range of 1.0-6.0 L/min.

In embodiments of the present invention, the reactor includes a discharge pipe including a discharge screw for continuously discharging treated biomass material and at least one cleaning nozzle is arranged inside the discharge part of the reactor to eject cleaning agent towards the discharge screw. In embodiments of the present invention, at least one cleaning nozzle is arranged to eject cleaning agent towards a leeward side of the discharge screw so that the cleaning agent is directed to impact the leeward side of the discharge screw threads.

In embodiments of the present invention, at least one cleaning nozzle is arranged to eject cleaning agent towards a leeward side of the reactor screw so that the cleaning agent is directed to impact the leeward side of the screw threads.

The cleaning nozzles may be attached to the inside wall of the reactor, for example, in through bores in the housing, or to an insert element, e.g. a tube, fixed inside the housing. The insert element may be shaped as a lining, tube or tubular shaped element fixed to the inner wall, for example, by means of welding.

In embodiments of the present invention, a cleaning agent delivery unit is arranged for providing cleaning agent to the cleaning nozzles.

According to an aspect of the present invention there is provided a cleaning process for a biomass material treatment stage in a continuous process, wherein the biomass material treatment stage includes a hydrolysis or pre-hydrolysis reactor, a feeding arrangement is arranged to continuously feed biomass material to an inlet of the reactor, the reactor includes a reactor screw for moving the biomass material through the reactor, the cleaning process comprises ejecting cleaning agent at predetermined intervals to the reactor screw when operating from at least one high-pressure cleaning nozzle arranged inside a housing of said reactor.

In embodiments of the cleaning process according to the present invention, the process further comprises ejecting cleaning agent at a pressure within a range of 15-225 bar towards the reactor screw during operating of the reactor.

In embodiments of the cleaning process according to the present invention, the process further comprises ejecting cleaning agent towards the reactor screw with an angle between an inner wall of the housing and a central line of the ray of cleaning agent within a range of 10-170 degrees.

In embodiments of the cleaning process according to the present invention, the process further comprises delivering or ejecting or providing cleaning agent at a flow rate within a range of 1.0-6.0 L/min.

In embodiments of the cleaning process according to the present invention, the process further comprises ejecting cleaning agent towards the discharge screw. In embodiments of the present invention, a further step is ejecting cleaning agent towards a leeward side of the discharge screw so that the cleaning agent is directed to impact the leeward side of the discharge screw threads.

In embodiments of the cleaning process according to the present invention, the process further comprises ejecting cleaning agent towards a leeward side of the reactor screw so that the cleaning agent is directed to impact the leeward side of the screw threads.

In embodiments of the present invention, the reactor stage is arranged to operate at a pressure in a range of 5-25 bar and/or a temperature in a range of 150° C.-230° C.

Further advantageous embodiments of the device according to the present invention and further advantages with the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF PREFERRED EMBODIMENTS

Figure 1:
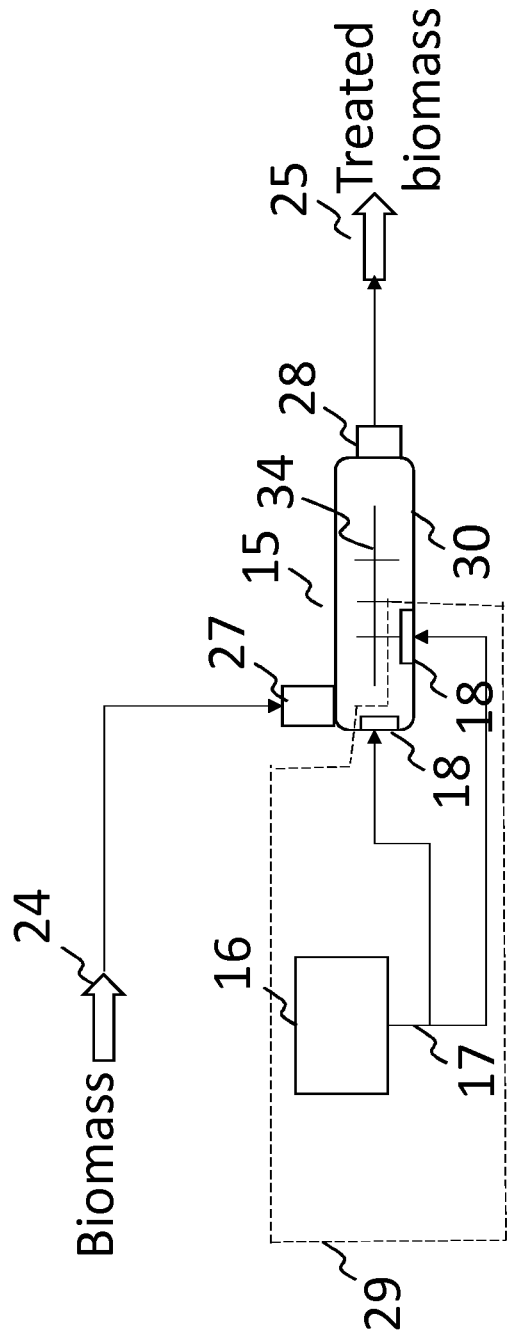
FIG. 1 is a schematic view of an embodiment of a system in which a cleaning system according to the present invention may be implemented.

In the drawings, similar or corresponding elements are denoted by the same reference numbers.

For the purpose of this disclosure, the term longitudinal refers to the direction along which a body, part or element has its greatest extension. Further, when the term longitudinal is used in connection with the axes of screws, the longitudinal axis corresponds to the rotational axis of the screw.

Figure 2:
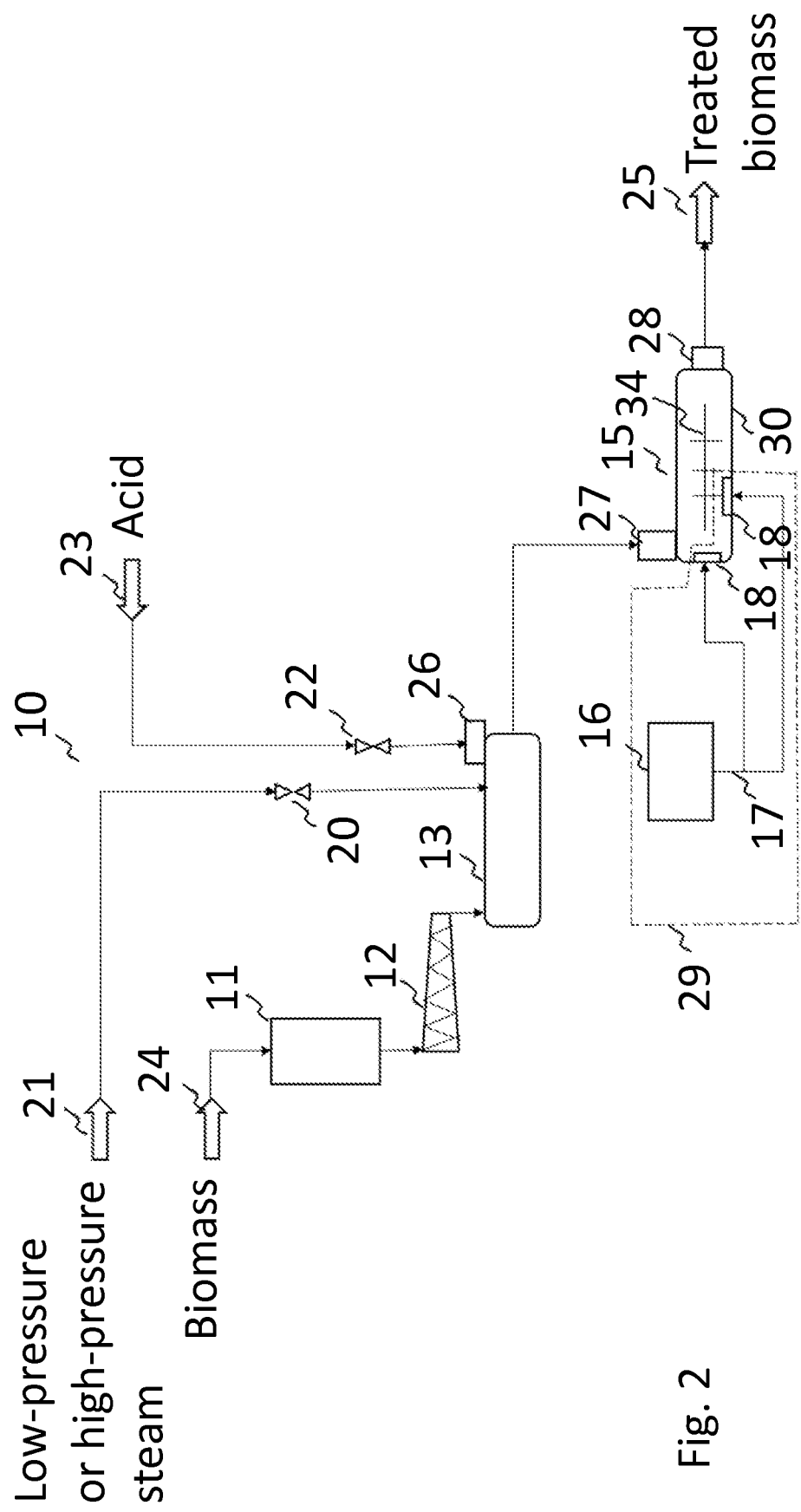
FIG. 2 is a schematic view of another embodiment of the system according to the present invention.

Turning first to FIG. 1, a cleaning system is schematically shown. Biomass material 24, which may have been treated in different treatment stages, is fed to a reactor stage 15, e.g. a pre-hydrolysis reactor 15, for pre-hydrolysis or hydrolysis. In FIG. 2, discussed below, an example system is shown in which the present invention may be implemented. Lignin is difficult to handle, for example, due to its propensity to stick to equipment and piping. This tendency to deposit on solid surfaces often causes plugging, problems that are particularly severe during acidic treatments such as hydrolysis or pre-hydrolysis processes. Lignin often deposits on surfaces in the reactor and in particular on the reactor screw and/or the discharge screw in the reactor.

A cleaning system 29 according to the present invention is arranged to obtain cleaning of the reactor 15 in order to, inter alia, minimize production interruptions and production stops for manual cleaning. Thus, the cleaning system 29 is arranged to automatically provide regular and intermittent cleaning of the reactor screw and/or discharge screw in the reactor during passage of biomass material through the reactor 15 in the continuous hydrolysis or pre-hydrolysis process where biomass material is continuously fed into the inlet 27 of the reactor and hydrolysed biomass material is continuously fed out from the discharge part or outlet part 28.

The cleaning system 29 comprises a cleaning agent delivery unit 16, 17 for delivering cleaning agent to cleaning nozzles 18 located or arranged inside the housing 30 of the reactor 15. The at least one high-pressure cleaning nozzle is arranged to eject cleaning agent at predetermined intervals and at a pressure within a range of 15-225 bar to the reactor screw 34 when operating to transport biomass material through the reactor 15. The cleaning agent delivery unit 16, 17 may be controlled by an operator or may be operated automatically according to pre-programmed cleaning sequences.

In embodiments of the present invention, the cleaning system 29 comprises a number of cleaning nozzles 18. This will be illustrated in detail below with reference to FIGS. 3 and 4, wherein the cleaning nozzles 18 may, for example, be arranged in series. According to one embodiment, the cleaning nozzles 18 are arranged at the inlet 27 of the reactor 15 in an array with a distance from each other within a range of 10-200 mm. In other embodiments, cleaning nozzles 18 are arranged in proximity to the inlet 27 of the reactor 15 so as to spray cleaning agent towards the reactor screw 34, inside the reactor housing 30 so as to spray cleaning agent towards the reactor screw 34, and in proximity to the outlet 31 so as to spray cleaning agent towards the discharge screw 34.

With reference now to FIG. 2, a system for pre-hydrolysis or hydrolysis of biomass materials in which the cleaning system according to the present invention may be implemented will be discussed. FIG. 2 is a schematic block diagram of a system 10 for biomass treatment. The lignocellulosic biomass 24 may be treated in different processes, such as a soaking process, before feeding the biomass material to the storage vessel, bin or silo 11. The lingocellulosic biomass material may be, for example, wood chips of softwood or hardwood, sawdust, grasses, straw, bagasse, kenaf, or other forms of agricultural waste or a combination thereof.

The lignocellulosic biomass 24, for example, wet biomass may have a moisture content in the range of 5-80%, in embodiments the DM (dry matter/dry material) is about 40-45%, and may have a temperature in a range of about 20-40° C.

The biomass material is thereafter fed further to a first de-watering stage 12, for example a least one feed screw 12, e.g. a plug screw feeder. In the context of the present invention, the term "plug screw feeder" relates to a feeder comprising a screw or similar rotating means and which is capable of feeding or transporting lignocellulosic material through the feeder at increased or maintained density of the material and that creates an essentially gas- and fluid-tight plug of the lignocellulosic material towards the end of the feeder. For example, according to an embodiment of such a plug screw feeder, a cross-sectional area of the circular housing of the feeder and the screw diameter decreases in the feeding direction thereby so as to create a decreasing space between the screw and the housing and thus resulting in an essentially gas- and fluid-tight plug of the lignocellulosic material towards the end of the feeder. According to another embodiment of a plug screw feeder, the cross-sectional area of the circular housing of the feeder is constant while the screw diameter and screw axis increases in the feeding direction thereby creating a decreasing space between the screw and the housing and thus resulting in an essentially gas- and fluid-tight plug of the lignocellulosic material towards the end of the feeder. As the skilled person realizes, there are other embodiments of feeders that achieves this purpose and thus are included within the definition of the term "plug screw feeder". Further, a force-feeding screw that may be used in the present invention is described in, for example, WO 2013126007.

In embodiments of the present invention, the biomass material has about 45-70% DM, or preferably about 50-60%, after the de-watering stage 12.

The filtrate from the de-watering stage 12 may be transported to a collector unit or filtrate tank (not shown) for re-use in the process. A screening stage may be arranged up-stream the filtrate tank in order to collect any solids that has passed through the de-watering screens together with the filtrate. The solids may then be recirculated back into the raw material flow, for example, to the storage vessel 11.

The de-watered biomass material may be fed further to an acidifying stage 13 where chemicals, such as e.g. acidifying chemicals 23 such as $H_2SO_4$, is added via an acid spraying system 26 and/or steam 21, e.g. high pressure steam at a pressure of about 650-4000 kPa or low-pressure steam at a pressure of about 90-1200 kPa, is added via a valve 20. In embodiments of the present invention, the addition stage may comprise an impregnator, a soaking unit or a mixer screw. A DM may be about 25-45% or, preferably, about 30-35% after the acidifying stage 13.

The biomass material is transported to ta reactor stage 15, e.g. a pre-hydrolysis reactor 15, for pre-hydrolysis or hydrolysis. The cleaning system 29 as shown in FIG. 1 is arranged to provide intermittent cleaning of the reactor screw and/or discharge screw in the reactor during passage of biomass material through the reactor 15 in the continuous hydrolysis or pre-hydrolysis process where biomass material is continuously fed into the inlet 27 of the reactor and hydrolysed biomass material is continuously fed out from the discharge part or outlet part 28.

Figure 3:
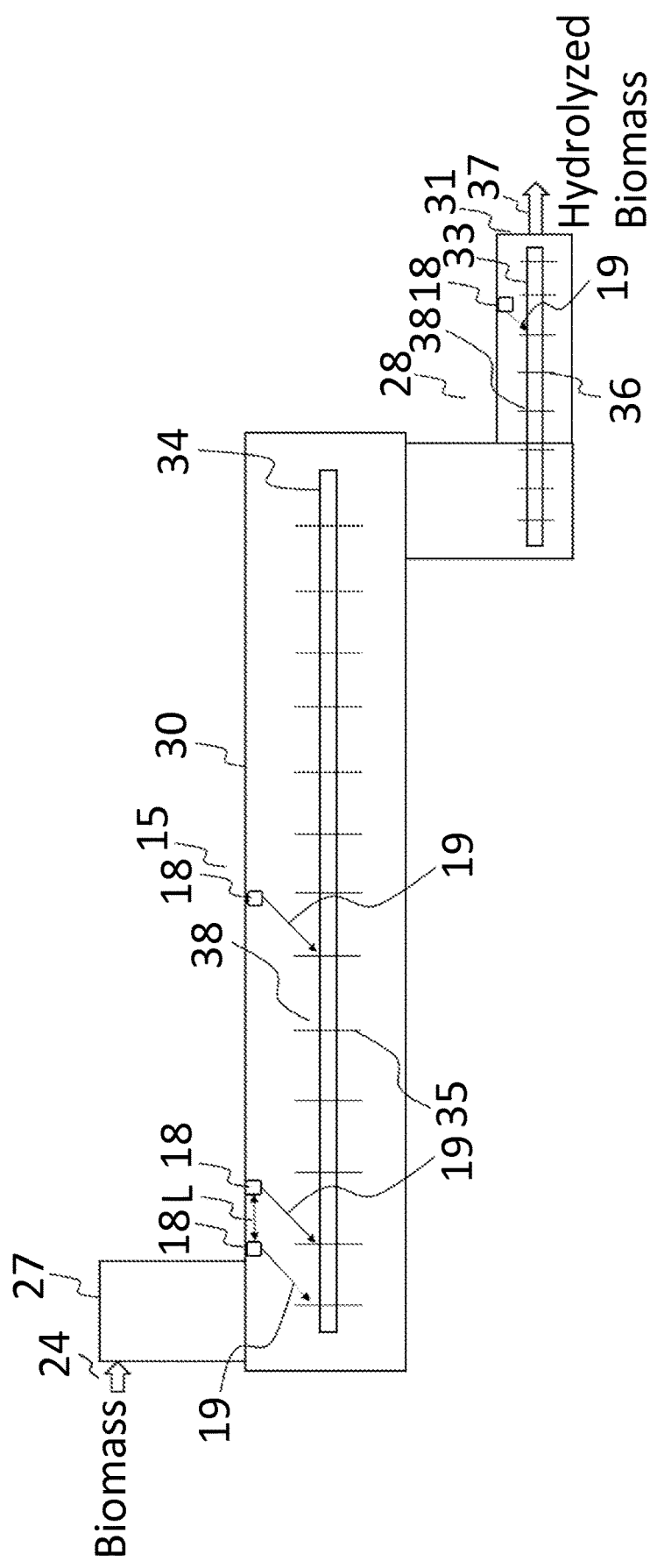
FIG. 3 is a schematic view of yet another further embodiment of the system according to the present invention.

With reference to FIG. 3, an embodiment of the present invention will be discussed. An array of cleaning nozzles 18 are arranged in proximity to the inlet part 27 of the reactor 15. The cleaning nozzles 18 are separated from each other with a distance L, for example, 20-200 mm, or 40-160 mm. The cleaning nozzles 18 may be arranged in a row, a zig-zag pattern or any other suitable pattern or configuration.

The cleaning nozzles 18 are preferably arranged to direct cleaning agent 19 towards the reactor screw 34 to impact the screw 34 on the leeward side 38 of the screw threads 35.

Furthermore, one or more cleaning nozzles 18 may also be arranged along the inside wall 32 of the housing 30, for example, approximately at the middle of the reactor 15 in a longitudinal direction (i.e. along the extension of the reactor screw 34) and is preferably arranged to direct cleaning agent 19 towards the reactor screw 34 to impact the screw 34 on the leeward side 38 of the screw threads 35.

Moreover, one or more cleaning nozzles 18 may be arranged at the discharge part 28, for example, in proximity to the outlet 31. The cleaning nozzles 18 arranged at the outlet 31 is/are preferably arranged to direct cleaning agent 19 towards the discharge reactor screw 33 to impact the screw 33 on the leeward side 38 of the screw threads 36.

Figure 4:
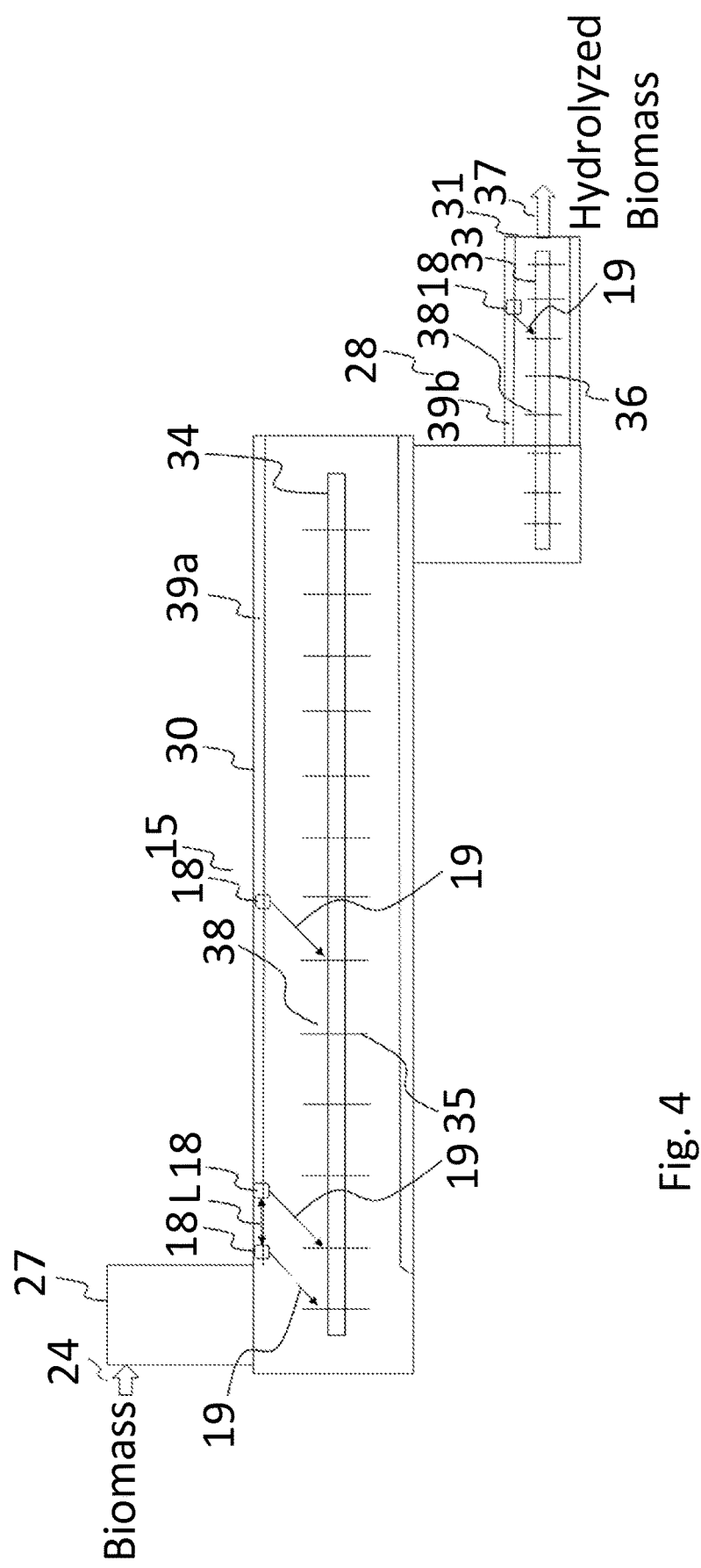
FIG. 4 is a schematic view of an embodiment of the system according to the present invention.

The cleaning nozzles 18 may be attached to the inside wall 32, for example, in through bores in the housing 30, or to an insert element 39a, e.g. a tube or lining, fixed inside the housing 30. The insert element 39a may be shaped as a lining or tubular shaped element fixed to the inner wall 32 by means of welding. In FIG. 4, an embodiment of the present invention is shown where the cleaning nozzles 18 are arranged on an insert element 39a. Further, cleaning nozzles 18 may be attached to the inside wall of the discharge pipe 28, for example, in through bores in the housing, or to an insert element 39b, e.g. a tube or lining, fixed inside the housing. The insert element 39b may be shaped as a lining or tubular shaped element fixed to the inner wall by means of welding. In FIG. 4, an embodiment of the present invention is shown where the cleaning nozzles 18 are arranged on an insert element 39b.

From the foregoing, it will be appreciated that specific embodiments of the disclosure have been described herein with purposes of illustration, but that various modifications may be made without deviating from the spirit and scope of the invention. Accordingly, the invention shall not be considered limited to the embodiments illustrated, but can be modified and altered in many ways by one skilled in the art, without departing from the scope of the appended claims.

The invention claimed is:

1. A cleaning system for a biomass material treatment stage in a continuous process system, wherein the biomass material treatment stage includes a hydrolysis or pre-hydrolysis reactor, a feeding arrangement is arranged to continuously feed biomass material to an inlet of the reactor, the reactor includes a reactor screw for moving the biomass material through the reactor and a discharge pipe including a discharge screw for continuously discharging treated biomass material, said cleaning system comprising:
at least one high-pressure cleaning nozzle arranged inside a housing of said reactor, wherein said at least one high-pressure cleaning nozzle is arranged to eject cleaning agent at predetermined intervals during operation of the reactor and at a pressure within a range of 15-225 bar to the reactor screw during operating of the reactor; and
wherein said at least one high-pressure cleaning nozzle is arranged to eject cleaning agent towards a leeward side of the reactor screw so as to impact a leeward side of screw threads of the reactor screw.

2. The cleaning system according to claim 1, wherein said cleaning system comprises a plurality of the high-pressure cleaning nozzles arranged at different locations inside the reactor to eject cleaning agent towards the reactor screw and/or the discharge screw.

3. The cleaning system according to claim 2, wherein said plurality of the high-pressure cleaning nozzles are arranged in series.

4. The cleaning system according to claim 1, wherein adjacent high-pressure cleaning nozzles are arranged with a distance from each other within a range of 10-200 mm.

5. The cleaning system according to claim 1, wherein said at least one high-pressure cleaning nozzle is arranged to eject cleaning agent to the reactor screw with an angle between an inner wall of the housing and a central line of a ray of cleaning agent within a range of 10-170 degrees.

6. The cleaning system according to claim 1, wherein said at least one high-pressure cleaning nozzle is arranged in proximity to the inlet of the reactor inside the housing of the reactor.

7. The cleaning system according to claim 1, wherein said at least one high-pressure cleaning nozzle is arranged to deliver cleaning agent at a flow within a range of 1.0-6.0 L/min.

8. The cleaning system according to claim 1, wherein said at least one high-pressure cleaning nozzle is arranged inside the discharge pipe.

9. The cleaning system according to claim 1, wherein said at least one high-pressure cleaning nozzle is arranged in an insert element provided inside said reactor.

10. The cleaning system according to claim 1, further comprising a cleaning agent delivery unit for providing cleaning agent to the at least one high-pressure cleaning nozzle.

11. A cleaning process for a biomass material treatment stage in a continuous process, wherein the biomass material treatment stage includes a hydrolysis or pre-hydrolysis reactor, a feeding arrangement is arranged to continuously feed biomass material to an inlet of the reactor, the reactor includes a reactor screw for moving the biomass material through the reactor and a discharge pipe including a discharge screw for continuously discharging treated biomass material, said cleaning process comprising ejecting cleaning agent at predetermined intervals and at a pressure within a range of 15-225 bar to the reactor screw when operating from at least one high-pressure cleaning nozzle arranged inside a housing of said reactor, wherein said at least one high-pressure cleaning nozzle is arranged to eject cleaning agent towards a leeward side of the reactor screw so as to impact a leeward side of screw threads of the reactor screw.

12. A cleaning system for a biomass material treatment stage in a continuous process system, wherein the biomass material treatment stage includes a hydrolysis or pre-hydrolysis reactor, a feeding arrangement is arranged to continuously feed biomass material to an inlet of the reactor, the reactor includes a reactor screw for moving the biomass material through the reactor and a discharge pipe including a discharge screw for continuously discharging treated biomass material, said cleaning system comprising:
at least one high-pressure cleaning nozzle arranged inside a housing of said reactor, wherein said at least one high-pressure cleaning nozzle is arranged to eject cleaning agent at predetermined intervals during operation of the reactor and at a pressure within a range of 15-225 bar to the reactor screw during operating of the reactor; and
wherein said at least one high-pressure cleaning nozzle is arranged to eject cleaning agent towards a leeward side of the reactor screw so as to impact a leeward side of screw threads of the reactor screw;
wherein said at least one high-pressure cleaning nozzle is arranged to eject cleaning agent to the reactor screw with an angle between an inner wall of the housing and a central line of a ray of cleaning agent within a range of 10-170 degrees; and
wherein said at least one high-pressure cleaning nozzle is arranged to deliver cleaning agent at a flow within a range of 1.0-6.0 L/min.

* * * * *